United States Patent [19]
Stull

[11] Patent Number: 5,079,918
[45] Date of Patent: Jan. 14, 1992

[54] EXPANSION TUBE EXHAUST SYSTEM

[76] Inventor: Gordon W. Stull, Rte. 1, Box 357, Newbloomfield, Mo. 65063

[21] Appl. No.: 479,277

[22] Filed: Feb. 12, 1990

[51] Int. Cl.$^5$ .............................................. F02B 27/02
[52] U.S. Cl. .......................................... 60/312; 60/314
[58] Field of Search .......................... 60/312, 313, 314

[56] References Cited
U.S. PATENT DOCUMENTS
2,542,756  2/1951  Draminsky .............................. 60/314

FOREIGN PATENT DOCUMENTS
19010  2/1979  Japan ..................................... 60/312

Primary Examiner—Douglas Hart

[57] ABSTRACT

An expansion tube exhaust system for an internal combustion engine, preferably a four-cycle engine, with a short diverging section connected to a much longer converging section, that absorbs the negative pressure back to the engine. The purpose of this invention is to lessen the back pressure going back to the engine.

5 Claims, 1 Drawing Sheet

EXPANSION TUBE EXHAUST SYSTEM

This is a substitute application for application Ser. No. 06/678/066 filing date Dec. 4, 1984 now abandoned.

BACKGROUND OF THE INVENTION

An expansion tube exhaust system for an internal combustion engine, most perferably a four-cycle internal combustion engine with a catalytic converter and muffler attached. With a short diverging section connected to a much longer converging section.

PRIOR ART

The expansion tubes of the prior art are more suited to two-cycle engines that have tuned systems. None have a short expansion with a much longer converging section.

SUMMARY OF THE INVENTION

The object of this invention is to lower the negative pressure going back to the engine resulting in better engine performance over all ranges of operation. We have experimented with two four cycle engines checking the mileage before and after attaching the expansion tube. In both experiments we observed improved efficiency in fuel savings and more power.

DESCRIPTION OF THE PREFERRED EMBODIMENTS

Figure 1:
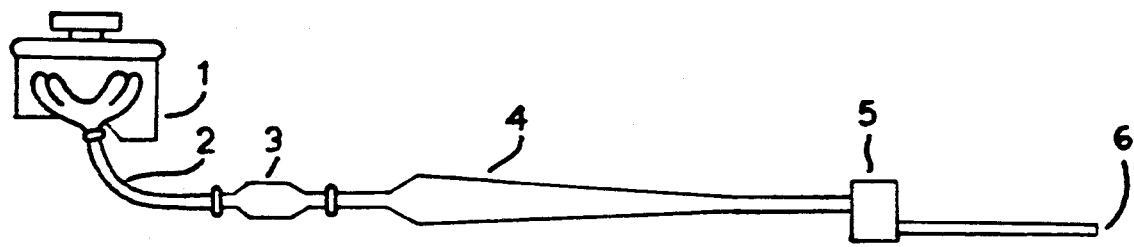
FIG. 1 shows the exhaust system of an automobile engine containing the expansion tube (4).

In FIG. 1, the four-cycle engine (1) discharges the exhaust gas into the exhaust system as pulse pressure into the exhaust pipe (2) to the catalytic converter (3) preferably a flow-through type converter to the conical expansion tube (4) to the muffer (5) and through the tail pipe (6) into the atmosphere. The expansion tube (4) doesn't have to be placed in any particular part of the exhaust system as long as it is somewhere behind the catalytic converter (3).

Figure 2:
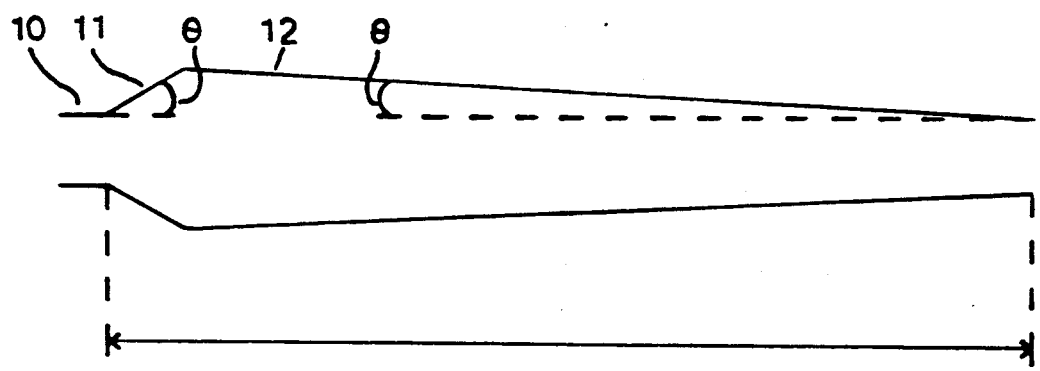
FIG. 2 shows the expansion tube exhaust system. Exhaust pipe (10) diverging section (11) the converging section (12).

FIG. 2—As the pressure pulse enters the conical expansion tube (4) figure (1) from the exhaust pipe (10) the diverging angle (11) (20° to 45°) reflects the pressure wave back into the gas flow which is being expanded outward. The Conical converging angle (12) (1° to 5°) slowly compresses the expanded gas and discharges it from the expansion tube. The negative pressure which is generated at the end of the tailpipe (6) FIG. 1 in response to the pulse pressure is absorbed by the expansion tube (4) FIG. 1 as it returns to the engine. This strengthens the engine vacuum as well as prolonging it.

This results in a cleaner fuel, and oxygen mix, resulting in a more thorough burn or explosion, giving more power with less fuel, cleaner exhaust, less carbon build up, and cleaner and cooler exhaust valves. Since the pulse pressure determines the strength of the negative pressure in the expansion tube, this gives a wide range of efficiency.

Although this invention will benefit any internal combustion engine. It will be of greater benefit to a four-cycle engine with a conventional exhaust system that has a catalytic converter and muffler.

FIG. 2—The diverging angle (11) and converging angle (12) are conical in shape, and cylindrical symmetry. The converging section (12) is connected to the outer end of the diverging section (11). The diverging section (11) is to expand to at least twice the sectional area of the passage to the exhaust system. The inlet end of the diverging section (11) has the same diameter as the outlet end of the converging section (12).

What is claimed is:

1. Expansion tube exhaust system for an internal combustion engine comprising a diverging section for reflection the exhaust pressure pulse back into the gas flow, said diverging section having an inlet end to be connected to said engine, said inlet end comprising the end of smaller diameter, where the angle of flare $\theta$ from said inlet end of said diverging section is in the range from 20° to 45°, converging section having an inlet end mated to the outlet end of said diverging section and having an outlet end for discharging the said gas from the engine, said inlet end of said converging section comprising the end of larger diameter, where the conical converging section converges at 2° to 5° to the end of the converging section.

2. An exhaust system in accordance with claim 1, wherein said diverging section and said converging section have conical shapes and cylindrical symmetry.

3. An exhaust system in accordance with claim 1, wherein the inlet end of said diverging section has the same diameter as the outlet end of said converging section.

4. An exhaust system in accordance with claim 1, wherein the expansion of the said diverging section is at least twice the sectional area of the passage to the exhaust system.

5. An exhaust system in accordance with claim 1, wherein the inlet end of said diverging section has the same diameter as the outlet end of said converging section.

* * * * *